US009358860B2

(12) United States Patent
Park

(10) Patent No.: US 9,358,860 B2
(45) Date of Patent: Jun. 7, 2016

(54) AIR VENT FOR A VEHICLE

(75) Inventor: Ki Young Park, Ulsan (KR)

(73) Assignee: NIFCO KOREA INC., Cheonan-Si, Chungheongnam-Do (KR)

( * ) Notice: Subject to any disclaimer, the term of this patent is extended or adjusted under 35 U.S.C. 154(b) by 722 days.

(21) Appl. No.: 13/519,231

(22) PCT Filed: Dec. 27, 2010

(86) PCT No.: PCT/KR2010/009351
§ 371 (c)(1),
(2), (4) Date: Aug. 31, 2012

(87) PCT Pub. No.: WO2011/081377
PCT Pub. Date: Jul. 7, 2011

(65) Prior Publication Data
US 2013/0005233 A1    Jan. 3, 2013

(30) Foreign Application Priority Data

Dec. 28, 2009  (KR) .................. 10-2009-0131876

(51) Int. Cl.
*B60H 1/34*  (2006.01)
(52) U.S. Cl.
CPC ...... *B60H 1/3421* (2013.01); *B60H 2001/3464* (2013.01)
(58) Field of Classification Search
CPC ................ B60H 2001/3464; B60H 1/3421; B60H 1/3428
USPC .......................................... 454/155
See application file for complete search history.

(56) References Cited

U.S. PATENT DOCUMENTS

| 3,701,311 | A | * | 10/1972 | McLarty | .............. | B60H 1/3428 454/319 |
| 4,750,410 | A | * | 6/1988 | Parker | ...................... | B60H 1/34 454/155 |
| 5,069,112 | A | * | 12/1991 | Takayama | ............ | B60H 1/3428 454/155 |
| 5,238,448 | A | * | 8/1993 | Komori | ................ | B60H 1/3421 454/155 |

(Continued)

FOREIGN PATENT DOCUMENTS

| CN | 1580662 A | 2/2005 | | |
| DE | 19745871 A1 | * | 4/1999 | .............. F16C 11/04 |

(Continued)

OTHER PUBLICATIONS

Japanese Patent Office, "Office Action for JP 2012-547004", Aug. 20, 2013.

(Continued)

*Primary Examiner* — Steven B McAllister
*Assistant Examiner* — Frances F Hamilton
(74) *Attorney, Agent, or Firm* — Manabu Kanesaka

(57) ABSTRACT

A vehicle air vent includes a plurality of vanes installed in an air discharge port in a body to be rotatable in a horizontal direction. By coupling the vanes to each other, when a knob provided on one vane is operated, all of the vanes are rotated together, and a hinge shaft provided at each of an upper end and a lower end of each vane is inserted into and connected to a hinge hole of a spacer provided at each of an upper end and a lower end of the air discharge port of the air vent body. A damper bushing connected to a front end portion of the vane hinge shaft passing through the hinge hole is installed below the hinge hole of a spacer to which each hinge shaft of the vane provided with the knob is connected.

4 Claims, 3 Drawing Sheets

(56) References Cited

U.S. PATENT DOCUMENTS

| | | | | |
|---|---|---|---|---|
| 5,338,252 | A * | 8/1994 | Bowler | B60H 1/3421 454/155 |
| 5,741,179 | A * | 4/1998 | Sun | B60H 1/3414 454/155 |
| 5,954,579 | A * | 9/1999 | Masui | B60H 1/3414 454/125 |
| 6,015,342 | A * | 1/2000 | Dennis | F24F 1/0011 454/155 |
| 6,047,951 | A * | 4/2000 | Ito | B60H 1/00678 251/306 |
| 6,736,719 | B1 * | 5/2004 | Gehring | B60H 1/3421 454/143 |
| 8,616,943 | B2 * | 12/2013 | Arndt | B60H 1/34 454/154 |
| 2003/0157880 | A1 * | 8/2003 | Nishida | B60H 1/3414 454/155 |
| 2005/0097704 | A1 * | 5/2005 | Song | B60H 1/3414 16/110.1 |
| 2005/0113013 | A1 * | 5/2005 | Hentschel | G05G 1/08 454/69 |
| 2006/0014485 | A1 * | 1/2006 | Sousa | B60H 1/3421 454/315 |
| 2006/0040606 | A1 * | 2/2006 | Park | B60H 1/3428 454/155 |
| 2006/0063480 | A1 * | 3/2006 | Neumann | B60H 1/3421 454/152 |
| 2006/0079165 | A1 * | 4/2006 | Bowler | B60H 1/00671 454/69 |
| 2006/0099903 | A1 * | 5/2006 | Bowler | B60H 1/00678 454/121 |
| 2007/0111653 | A1 * | 5/2007 | Endou | B60H 1/3421 454/155 |
| 2008/0119124 | A1 * | 5/2008 | Okuno | B60H 1/3428 454/69 |
| 2009/0286462 | A1 * | 11/2009 | Goto | B60H 1/3428 454/155 |
| 2010/0120347 | A1 * | 5/2010 | Gehring | B60H 1/345 454/155 |
| 2010/0263401 | A1 * | 10/2010 | Sakakibara | B60H 1/3421 62/408 |
| 2013/0065505 | A1 * | 3/2013 | Yoskowitz | 454/317 |

FOREIGN PATENT DOCUMENTS

| | | | | |
|---|---|---|---|---|
| JP | S52-30657 | U | 3/1977 | |
| JP | S60-97617 | U | 7/1985 | |
| JP | H05-32946 | U | 4/1993 | |
| JP | H08-142659 | A | 6/1996 | |
| JP | H09-220927 | A | 8/1997 | |
| JP | 2004114799 | A * | 4/2004 | B60H 1/34 |
| JP | 2004-210111 | A | 7/2004 | |
| KR | 10-2005-0076512 | A | 7/2005 | |
| KR | 10-0862498 | B1 | 10/2008 | |

OTHER PUBLICATIONS

European Patent Office, "European Search Report for EP 10 84 1209", May 10, 2013.

China Patent Office, "Office Action for CN 201080059607.7," Apr. 22, 2014.

* cited by examiner

AIR VENT FOR A VEHICLE

FIELD OF THE INVENTION

The present invention relates to a vehicle air vent that guides external air to the inside of a vehicle, and in particular, a vehicle air vent capable of stably keeping a horizontal operating force of vanes installed in an air discharge port of an air vent body.

BACKGROUND ART

Generally, in the vehicle air vent, a plurality of vanes is rotatably provided in the air discharge port of the body to adjust the direction of air discharged to the inside of the vehicle and seal the air discharge port of the body.

In the vehicle air vent, since a plurality of vanes is coupled to each other, when a knob provided on one vane is operated, all of the vanes are rotated together.

A hinge shaft to be inserted into and connected to a hinge hole of the air vent body or a spacer is provided at each of an upper end and a lower end of each vane.

FIG. 1 is a perspective view of a vane hinge shaft connecting site of a conventional vehicle air vent.

As shown in FIG. 1, as described above, the conventional vehicle air vent has a simple configuration in which a hinge shaft 221 of a vane 220 is inserted into and connected to a hinge hole 231 of a spacer 230.

The conventional vehicle air vent adjusts the horizontal operating force of the vane 220 by adjusting the amount of an overlap between the hinge shaft 221 of the vane 220 and the hinge hole 231 of the spacer 230.

However, when the horizontal operating force of the vane 220 is adjusted by adjusting the overlap amount as in the conventional vehicle air vent, a deviation of the operating force becomes sharp with a change of the overlap amount in dimension of each objects, and the overlap amount decreases due to wear caused by friction between plastics, resulting in a rapid decrease in the operating force.

SUMMARY OF THE INVENTION

Problem to be Solved by the Invention

The present invention is made in consideration with such conventional circumstances, and its object is to provide a vehicle air vent capable of stably keeping a horizontal operating force of vanes installed in an air discharge port of an air vent body so as to be rotatable in a horizontal direction.

Means for Solving the Problems

To attain the above-mentioned object, in a vehicle air vent according to the present invention, a damper bushing connected to a front end of the vane hinge shaft passing through the hinge hole is installed below the hinge hole provided in the air vent body or the spacer, to which the vane hinge shaft is inserted and connected.

According to the present invention, a plurality of vanes is provided in an air discharge port of a body so as to be rotatable in a horizontal direction. By coupling the vanes to each other, when a knob provided on one vane is operated, all of the vanes are rotated together, and a hinge shaft provided at each of an upper end and a lower end of each vane is inserted into and connected to a hinge hole of a spacer provided at each of an upper end and a lower end of the air discharge port of the air vent body. A damper bushing connected to a front end of the vane hinge shaft passing through the hinge hole is installed below the hinge hole of each spacer, to which each hinge shaft of the vane provided with the knob is connected.

According to the present invention, a damper bushing insertion space is provided above or below the hinge hole of each spacer, to which the hinge shaft of the vane provided with the knob is connected, and the damper bushing is inserted into and installed in the damper bushing insertion space. The damper bushing and the damper bushing insertion space can be rectangular so as not to float in a horizontal direction during rotation of the vanes.

The damper bushing can be made of silicon rubber so as to obtain smooth feeling at operation of the knob.

Effect of the Invention

The vehicle air vent according to the present invention can improve the vane operating feeling via the damper bushing connected to the vane hinge shaft, reduce shock noises and operational noises to external loads, and prevent a deviation of the operating force, which is caused by temperature change. Moreover, the uniform operational force can be ensured, and even during long-time use, the vane operating force does not change.

Since the operating force can be adjusted by adjusting the hardness of the damper bushing, even when a mold is not modified, the vane operating force can be managed, the frictional durability of the hinge connection site is improved, and the operational reliability can be ensured.

BEST MODE FOR CARRYING OUT THE INVENTION

Specific technical concepts of the present invention will be described below in detail based on an embodiment shown in appended drawings.

Figure 1:
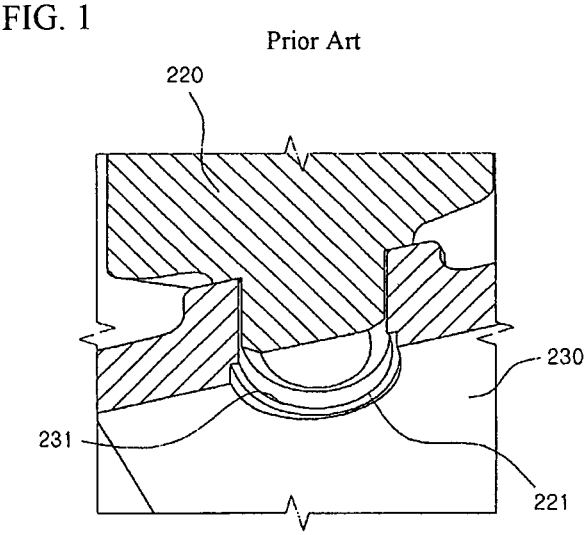
FIG. 1 is a perspective view of a vane hinge shaft connecting site of a conventional vehicle air vent.
Figure 2:
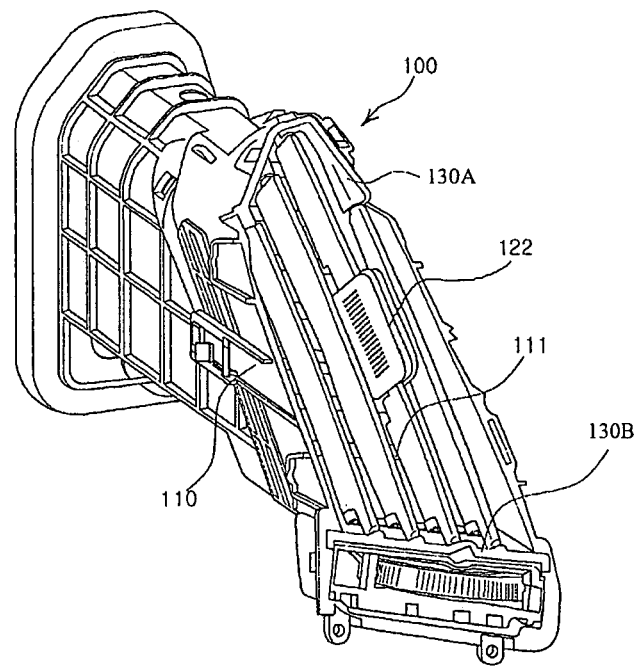
FIG. 2 is a perspective view of one embodiment of the present invention.
Figure 3:
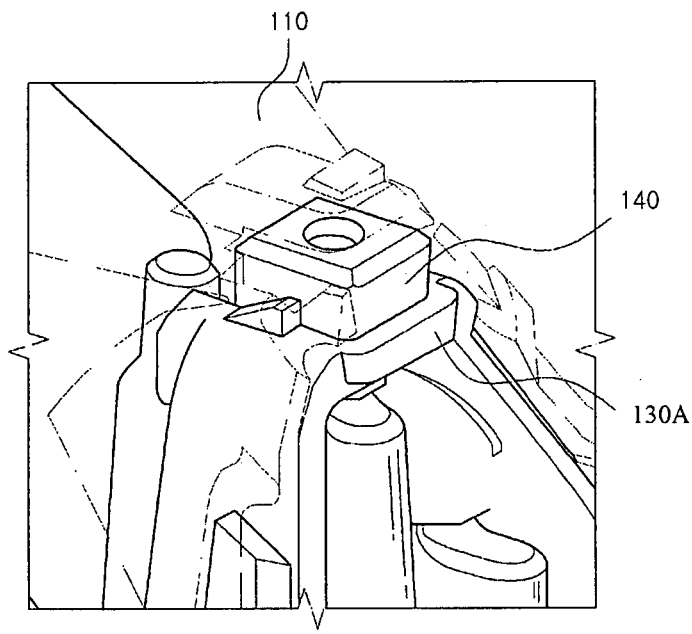
FIG. 3 is an enlarged perspective view of an upper hinge shaft site of a vane in accordance with one embodiment of the present invention.
Figure 4:
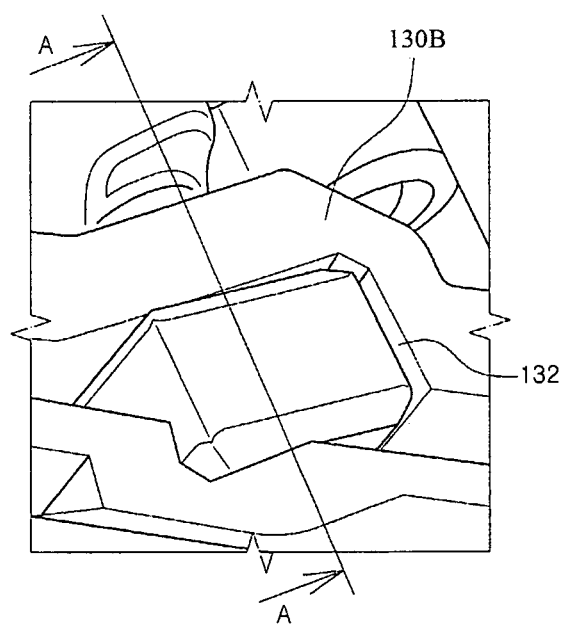
FIG. 4 is an enlarged perspective view of a lower hinge shaft site of the vane in accordance with one embodiment of the present invention.

FIG. 2 is a perspective view of one embodiment of the present invention, FIG. 3 is an enlarged perspective view of an upper hinge shaft site of a vane in accordance with one embodiment of the present invention, and FIG. 4 is an enlarged perspective view of a lower hinge shaft site of the vane in accordance with one embodiment of the present invention.

Figure 5:
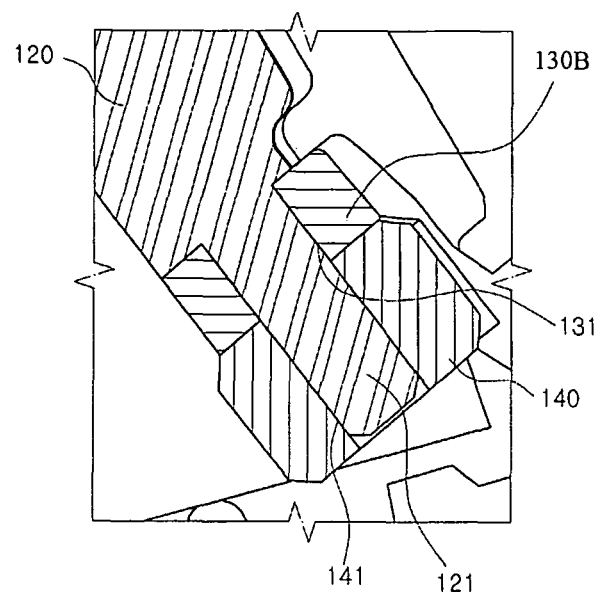
FIG. 5 is a sectional view taken along a line A-A in FIG. 4.

FIG. 5 is a sectional view taken along a line A-A in FIG. 4.

As shown in FIG. 2 to FIG. 5, in a vehicle air vent 100 according to the present invention, a plurality of vanes 120 is provided in an air discharge port 111 of a body 110 so as to be rotatable in a horizontal direction. By coupling the vanes 120 to each other, when a knob 122 provided on one vane 120 is operated, all of the vanes 120 are rotated together, and a hinge shaft 121 provided at each of an upper end and a lower end of each vane 120 is inserted into and connected to a hinge hole 131 of spacers, including an upper spacer 130A and a lower spacer 130B, provided at each of an upper end and a lower end of the air discharge port 111 of the air vent body 110. A damper bushing 140 connected to a front end of the vane hinge shaft 121 passing through the hinge hole 131 is installed below the hinge hole 131 of each spacer 130A and 130B, to which each hinge shaft 121 of the vane 120 provided with the knob 122 is connected.

In the illustrated embodiment, a damper bushing insertion space 132 is provided above or below the hinge hole 131 of each spacer 130A and 130B, to which the hinge shaft 121 of the vane 120 provided with the knob 122 is connected, and the damper bushing 140 is inserted into and installed in the damper bushing insertion space 132.

Also, in the illustrated embodiment, the air vent body includes a frame arranged adjacent to the lower spacer, and the damper bushing insertion space is formed between the lower spacer and the frame to install the damper bushing.

According to the present invention, it is desired that the damper bushing 140 is made of silicon rubber so as to obtain smooth feeling at operation of the knob 122.

In the illustrated embodiment, the damper bushing 140 and the damper bushing insertion space 132 are rectangular and do not float in a horizontal direction during rotation of the vanes 120. However, the shape of the damper bushing 140 and the damper bushing insertion space 132 according to the present invention is not limited to the illustrated embodiment, and as a matter of course, it may be modified into other predictable shape.

In the illustrated embodiment, a connection hole 141 to which the vane hinge shaft 121 is inserted and connected is provided in the damper bushing 140. However, the connection hole 141 provided in the damper bushing 140 according to the present invention may be shaped like a concave shape groove.

In the vehicle air vent 100 thus configured according to the present invention, the front end of each hinge shaft 121 of the vane 120 provided with the knob 122 passes through the hinge hole 131 of each spacer 130A and 130B and then, is connected to the damper bushing 140. When the vane 120 is rotated with the knob 122, a rotational resistance between the vane hinge shaft 121 and the damper bushing 140 occurs, and due to friction between the damper bushing 140 made of a soft material and the vane hinge shaft 121, the vanes 120 can be smoothly rotated, thereby improving operational feeling.

The vehicle air vent 100 according to the present invention can reduce shock noises and operational noises to external loads via the damper bushing 140 connected to the vane hinge shaft 121, and prevent a deviation of the operating force, which is caused by temperature change. Moreover, the uniform operational force can be ensured, and even during long-time use, the operating force of the vanes 120 does not change.

Since the operating force can be adjusted by adjusting the hardness of the damper bushing 140, even when a mold is not modified, the vane operating force can be managed, the frictional durability of the hinge connection site is improved, and the operational reliability can be ensured.

It is apparent for those skilled in the art that the present invention described above is not limited by the above description, and may be variously replaced, modified and changed so as not to deviate from the technical concept of the present invention.

DESCRIPTION OF REFERENCE NUMERALS

100: vehicle air vent, 110: body, 111: air discharge port, 120: vane, 121: hinge shaft, 122: knob, 130A, 130B: spacers (upper spacer and lower spacer), 131: hinge hole, 132: damper bushing insertion space, 140: damper bushing

What is claimed is:

1. A vehicle air vent comprising:
a plurality of vanes adapted to be installed at an air discharge port in an air vent body and arranged vertically parallel to each other, the plurality of vanes being coupled to each other to rotate in a horizontal direction all together,
a knob provided on one of the plurality of vanes and operated to rotate the plurality of vanes coupled together,
hinge shafts, each being provided at each of an upper end and a lower end of each of the plurality of vanes to project upwardly and downwardly from each of the plurality of vanes,
spacers adapted to be provided at an upper end and a lower end of the air discharge port of the air vent body, the spacers including a lower spacer provided at the lower end of the air discharge port and having hinge holes through which the hinge shafts are inserted, the lower spacer being arranged to form a damper bushing insertion space having a rectangle at a portion outside the hinge hole through which the hinge shaft of the one of the plurality of vanes having the knob is inserted, and
a damper bushing rotationally connected to one end portion of the hinge shaft of the one of the plurality of vanes passing through the hinge hole, and installed in the damper bushing insertion space,
wherein the damper bushing is made of silicone rubber to obtain smooth feeling at operation of the knob.

2. The vehicle air vent according to claim 1, wherein the damper bushing is rectangular so as not to float in a horizontal direction in the damper bushing insertion space during rotation of the plurality of vanes.

3. The vehicle air vent according to claim 1, wherein the hinge shaft of the one of the plurality of vanes having the knob and connected to the space has a length to engage the spacer and the damper bushing.

4. The vehicle air vent according to claim 3, wherein each of the hinge shafts projects linearly from each end of the plurality of vanes in a longitudinal direction of the plurality of vanes.

* * * * *